(12) United States Patent
Olin et al.

(10) Patent No.: US 7,748,267 B2
(45) Date of Patent: Jul. 6, 2010

(54) MASS FLOW METER WITH SOLDER/BRAZE-FLOW SECURED SPACER

(75) Inventors: John G. Olin, Carmel Valley, CA (US); John P. Smitherman, Salinas, CA (US)

(73) Assignee: Sierra Insturments, Inc., Monterey, CA (US)

( * ) Notice: Subject to any disclaimer, the term of this patent is extended or adjusted under 35 U.S.C. 154(b) by 244 days.

(21) Appl. No.: 12/106,772

(22) Filed: Apr. 21, 2008

(65) Prior Publication Data

US 2009/0260431 A1    Oct. 22, 2009

(51) Int. Cl.
*G01F 1/68* (2006.01)
(52) U.S. Cl. .................................................. 73/204.22
(58) Field of Classification Search ............... 73/204.22, 73/204.24, 204.19
See application file for complete search history.

(56) References Cited

U.S. PATENT DOCUMENTS

| | | | | |
|---|---|---|---|---|
| 5,726,624 | A * | 3/1998 | Caffee et al. ................... | 338/28 |
| 5,880,365 | A * | 3/1999 | Olin et al. ................. | 73/204.25 |
| 5,999,081 | A * | 12/1999 | Hannigan et al. ............. | 338/28 |
| 6,628,202 | B2 * | 9/2003 | McQueen et al. ........... | 340/603 |
| 6,666,578 | B2 * | 12/2003 | Gibbs et al. ................. | 374/142 |

* cited by examiner

*Primary Examiner*—Jewel Thompson
(74) *Attorney, Agent, or Firm*—LaRiviere, Grubman & Payne, LLP

(57) ABSTRACT

A thermal anemometer or mass flow meter typically having temperature and flow velocity sensor elements is provided in which a thin film temperature sensor is used in the heated sensor of the fluid velocity sensor element of the system. At least one thin-film RTD sensor is held within a spacer or interface member and the spacer, optionally, received within a housing. The thermal anemometer is preferably constructed to offer sufficient precision and accuracy in its design to be suitable for sensitive scientific and industrial applications. This goal is achieved while using cost effective parts by employing a construction approach in which the spacer and RTD sensor(s) is secured in place by solder, braze or another compound flowed into place while inserting the spacer and/or sensor(s).

20 Claims, 3 Drawing Sheets

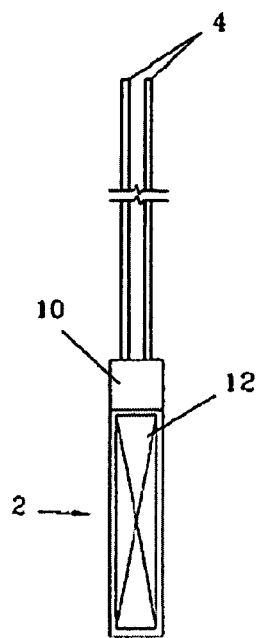
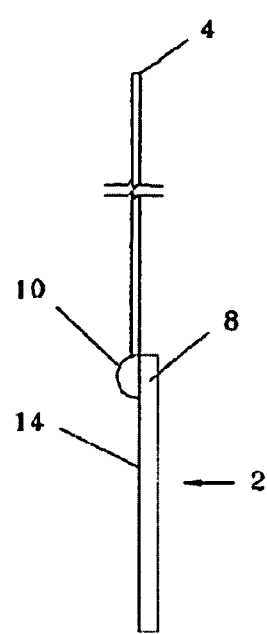
Fig. 1A
(Prior Art)
Fig. 1B
(Prior Art)
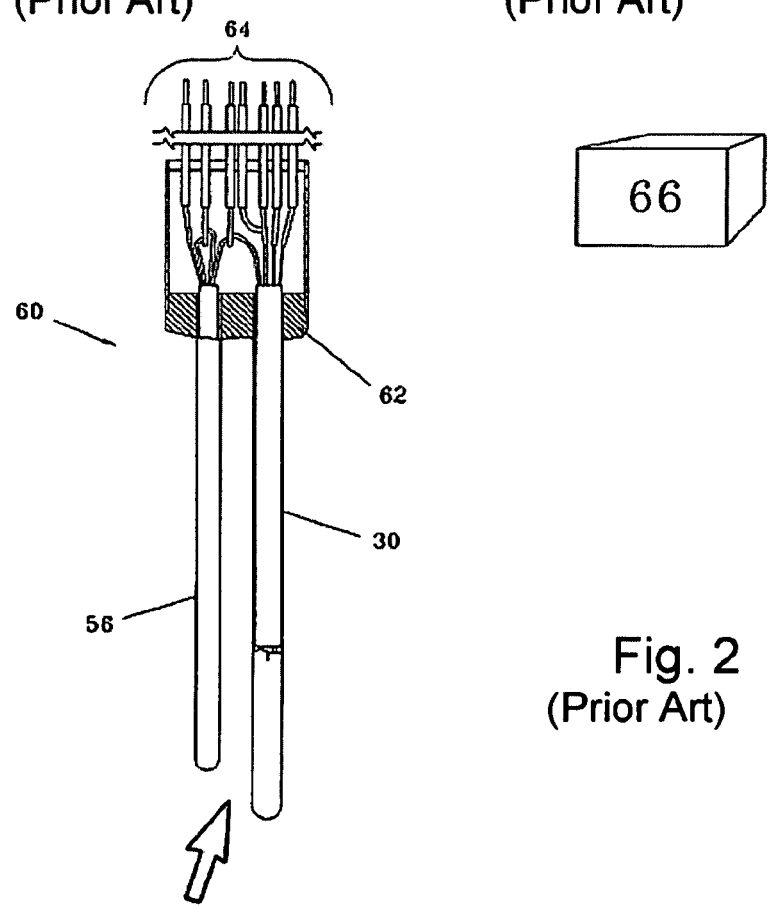
Fig. 2
(Prior Art)

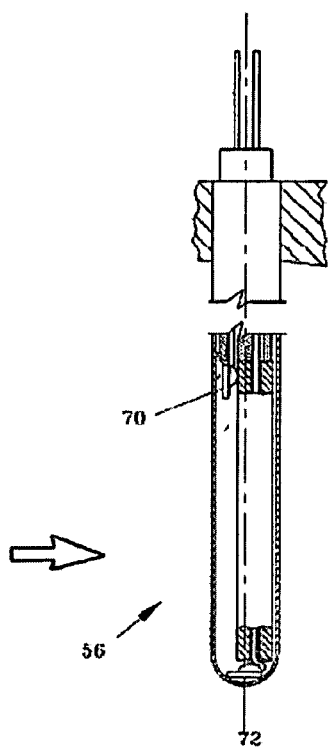
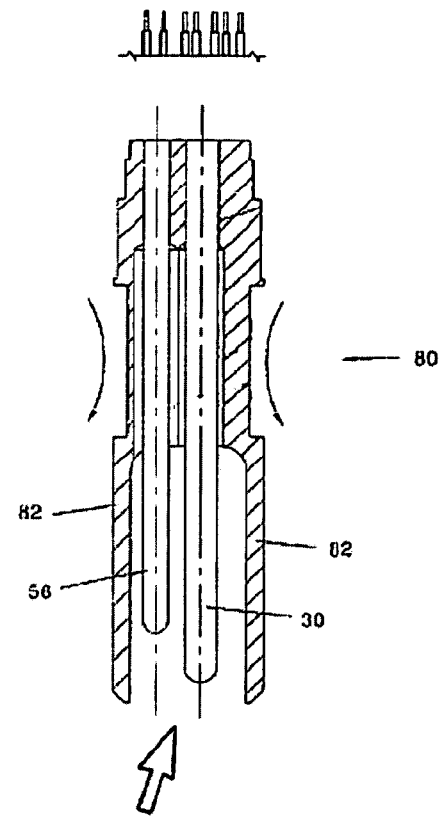
Fig. 3
(Prior Art)
Fig. 4
(Prior Art)
Fig. 5A
(Prior Art)
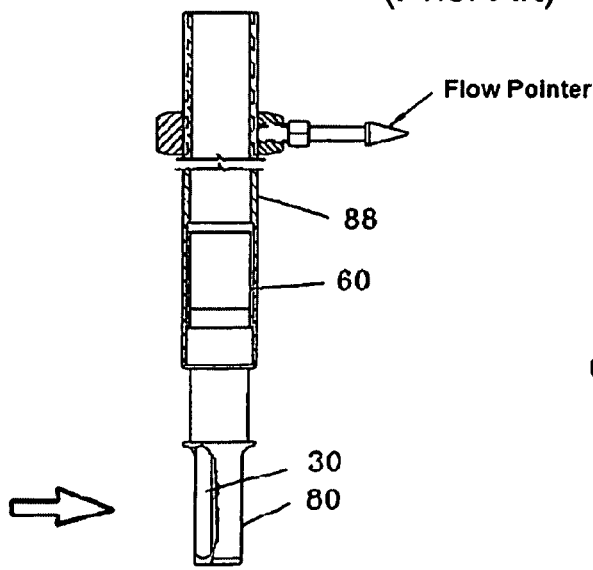
Fig. 5B
(Prior Art)
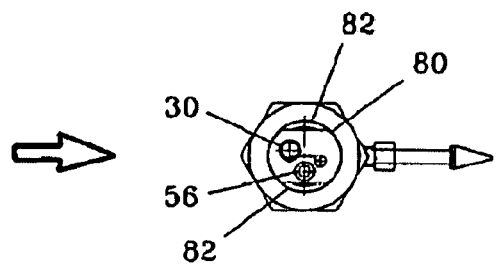

MASS FLOW METER WITH SOLDER/BRAZE-FLOW SECURED SPACER

FIELD OF THE INVENTION

This invention relates to mass flow meters, particularly regarding their manufacture at decreased cost, yet of such quality for critical applications.

BACKGROUND OF THE INVENTION

The mass flow rate of a fluid (defined by its average velocity multiplied by its mass density multiplied by the cross-sectional area of the channel through which the flow travels) is a measured quantity of interest in the control or monitoring of most practical and industrial applications, such as any chemical reaction, combustion, heating, cooling, drying, mixing, fluid power, etc. Generally speaking, a thermal anemometer is used to measure the mass velocity at a point or small area in a flowing fluid—be it liquid or gas. The mass velocity of a flowing fluid is its velocity referenced to standard or normal temperature and pressure. The mass velocity averaged over the flow channel's cross-sectional area multiplied by the cross-sectional area is the standard or normal volumetric flow rate through the channel and is a common way of expressing the total mass flow rate through the channel.

The thermal anemometer is sometimes referred to as an immersible thermal mass flow meter because it is immersed in a flow stream or channel in contrast to other thermal mass flow meter systems, such as those which sense the total mass flow rate by means of a heated capillary tube mounted externally to the flow channel.

The operational principles of thermal anemometers derive from the fact that a heated sensor placed in a fluid stream transfers heat to the fluid in proportion to the mass flow rate of the fluid. In a thermal anemometer, one such heated sensor (commonly referred to as the velocity sensor) is provided together with another sensor that detects fluid temperature. In the constant-temperature mode of operation, the heated sensor is maintained at a constant temperature above the fluid temperature. The temperature difference between the flowing fluid and the heated sensor results in an electrical power demand in maintaining this constant temperature difference that increases proportional to the fluid mass flow rate and that can be calculated.

Alternately, some thermal anemometers operate in a constant-current mode wherein a constant current or power is applied to the heated sensor and the fluid mass flow rate is calculated from the difference in the temperature of the heated sensor and the fluid temperature sensor, which decreases as mass flow rate increases. Thermal anemometers have greater application to gases, rather than liquids, because their sensitivity in gases is higher than in liquids.

Because the parts of the heated sensor of known thermal anemometers are not sufficiently reproducible dimensionally or electrically, known thermal anemometers require multi-point flow calibration of electrical output versus mass flow rate, usually in the actual fluid and with the actual ranges of fluid temperature and pressure of the application. For industrial applications, the heated sensor and fluid temperature sensor of known thermal anemometers typically have their respective sensors encased in a protective housing shell (e.g., thermowell or metallic tube sealed at its end, etc.). Usually, the encased heated sensor is inserted into the tip of the housing and is surrounded by a potting compound, such as epoxy, ceramic cement, thermal grease, or alumina powder.

In such a system, "skin resistance" and stem conduction are two major contributors to non-ideal behavior and measurement errors in thermal anemometers constructed in this manner. Skin resistance is the thermal resistance between the encased heated sensor and the external surface of the housing exposed to the fluid flow. The well-known hot-wire thermal anemometers have zero skin resistance, but thermal anemometers with a housing do have skin resistance. The use of a potting compound substantially increases the skin resistance because such potting compounds have a relatively low thermal conductivity.

Skin resistance (in units of degrees Kelvin per watt) results in a temperature drop between the encased heated sensor and the external surface of the housing which increases as the electrical power supplied to the heated sensor increases. Skin resistance creates a "droop" and decreased sensitivity in the power versus fluid mass flow rate calibration curve, especially at higher mass flow rates. The droop is difficult to quantify and usually varies from meter to meter because of variations both in the parts of construction and in installation. The ultimate result of these skin-resistance problems is reduced accuracy. Furthermore, the use of a surrounding potting compound can create long-term measurement errors caused by aging and by cracking due to differential thermal expansion between the parts of the heated sensor. Accordingly, the highest quality heated sensors have a skin resistance with a low numerical value that remains constant over the long term.

Stem conduction (in units of watts) causes a fraction of the electrical power supplied to the encased heated sensor to be passed through the stem of the heated sensor, down the housing, lead wires, and other internal parts of the heated sensor, and ultimately to the exterior of the fluid flow channel. Stem conduction couples the electrical power supplied to the encased heated sensor to the ambient temperature outside the channel. If the ambient temperature decreases, stem conduction increases; if it increases, the conduction decreases. In either case, as ambient temperature changes, stem conduction changes, and measurement errors occur. Similarly, stem conduction is responsible for errors in the encased fluid temperature sensor's measurement because it too is coupled to the ambient temperature.

Further discussion of the operational principles of known immersible thermal mass flow meters, their several configurations, particular advantages, uses, skin resistance, and stem conduction are presented in section 29.2 entitled "Thermal Anemometry" by the lead inventor hereof as presented in *The Measurement Instrumentation and Sensors Handbook*, as well as U.S. Pat. Nos. 5,880,365; 5,879,082; and 5,780,736, all assigned to Sierra Instruments, Inc., and each incorporated by reference herein in its entirety.

As noted in the referenced material, resistance temperature detectors (RTDs) may be employed in the heated sensor and the fluid temperature sensor, when one is provided. Alternative sensors for either the heated sensor or the fluid temperature sensor include thermocouples, thermopiles, thermistors, micro-machined sensors and semiconductor junction thermometers. RTD sensors are generally recognized as being more accurate and stable than any of these alternatives.

RTD sensors operate on the principle of electrical resistance increasing in accordance with increasing temperature. Wire-wound sensors, thin-film sensors and micro-machined RTD sensors have been used variously in thermal anemometers.

Thin-film RTD (TFRTD) sensors offer an edge in accuracy because they are mass produced using automated production operations, employing technologies such as photolithography and lasers. This results in the comparatively high reproducibility, accuracy, stability, and cost-effectiveness of thin-film RTD sensors. Yet, prior to the teaching offered in U.S. Pat. Nos. 6,971,274 and 7,197,953, each to the lead inventor hereof, no high quality application of the thin-film RTD technology-based thermal anemometer was available for industrial applications.

Some thermal anemometers were available that used thin-film RTDs not entirely encased in a protective housing, with the RTD surfaces directly exposed to the fluid. However, due to the fragility, poorer dimensional tolerances, and the oscillating and turbulent flow around the thin-film RTD body, etc., such devices—standing alone—had only proven suitable for light duty, low-end, low-accuracy/precision requirement applications. Still, there are examples in which a thin-film RTD sensor was encased in the tip of a metallic tube (e.g., 316 stainless steel) sealed at its end and surrounded by a potting compound (e.g., epoxy, ceramic cement, thermal grease, or alumina powder). Yet, sensor fabrication with such potting compounds is inherently irreproducible due to variations in their composition, amount used, insufficient wetting of surfaces, and/or air bubbles. These irreproducibilities, combined with the aforementioned high skin resistance and potential for long-term instability associated with the use of potting compounds, limits the overall accuracy of known thermal anemometers constructed in this manner.

The above-referenced Olin patents offered solutions to provide robust and highly accurate thermal anemometers using thin-film RTD technology. Specifically, in a "dry" heated sensor, an apparatus for use as a mass flow meter in a fluid is provided comprising a metal spacer within a metal shell, the spacer having a cross section defining a circular diameter and a rectangular hole, with the spacer adapted to closely hold a thin-film RTD temperature sensor in the hole and with the spacer closely held in a outer casing or shell. In this assembly, the metal spacer body comprises a powdered metal fabricated piece or a machined metal solid. Thus, the active portion of the heated sensor has no potting compound or other bonding materials adjacent thereto.

While of superb quality, such devices have proven less cost-effective to manufacture that those of the present invention. While, at the same time, those according to the present invention offer the same—and possibly better—performance. As such, the present invention offers a further advance in the art.

SUMMARY OF THE INVENTION

The present invention offers a mode of device construction in connection with thin-film RTD sensors that is able to leverage the cost advantage offered by such products, but still attain the measurement quality required of scientific and industrial applications. Namely, systems according to the present invention offer performance with as low as about 1% to about 2% of reading error in accuracy over a mass flow rate range of about 10% to about 100% of full scale (or larger), and over a relatively larger fluid temperature and pressure range. When coupled with computations based on heat-transfer correlations and other corrective algorithms, devices constructed according to the present invention optionally allow fewer flow calibration points, calibration with a low-cost surrogate flow calibration fluid (i.e., air in lieu of other gases), and grade "A" to "A+" accuracy over wider ranges for mass flow rate, fluid temperature, and fluid pressure.

To achieve one or more of these benefits, the present invention utilizes a shell-and-spacer architecture. But instead of seeking to capture the thin-film RTD closely in the spacer and the spacer within a shell (as in the above-reference '274 Olin family patents), the spacer is configured to provide both internal and external gaps, where the internal gap is between itself and the sensor(s), and an external gap is between itself and a housing shell. Together with an open bore, the open spacing enables securing the spacer containing at least one thin-film RTD in a housing shell by immersing the spacer and RTD(s) in a bolus of fill material. Advantageously, the fill material is braze or solder that liquefies solidifies after heating to allow the immersion.

With the spacer and RTD(s) so-encased, high thermal resistance air gaps are eliminated (or at least substantially eliminated) as a combination of displacement and/or capillary action push/draw the liquid solder/braze into the engineered gaps and chase out the air. The liquid then cools so it solidifies. The thermal conductivity of the solidified solder/braze and small size of the gaps (detailed further below) provides for very good overall thermal conductance of the portion of the meter in which the spacer and RTD(s) is/are housed, resulting in the desired low level of skin resistance.

The use of solder or braze as fill material offers another advantage. With the glass-coated thin-firm RTD(s) bonded into the spacer and the spacer bonded into the shell, a highly dimensionally stable and vibration-resistant construction results. To ensure dimensional stability, it is desirable to use shell and spacer metals with matched (or at least approximately matched) thermal expansion ratios as in the case of stainless steel and copper. As for the solder or braze, there is very little of it to expand/contract and create high internal stresses. Rather, its ductility favors riding along with any expansion and contraction of the major sensor body elements (i.e., the shell and spacer, and the spacer and the sensor).

Regarding vibration resistance, the solder or braze helps stabilize or "hold-in" the thin platinum film lattice, thereby protecting it from vibration problems. According to the article "Trends in Process Temperature Measurement: *An Evolving Technology Segment Changes Focus to Meet End-User Needs,*" by Mike Cushing published in the Industry Outlook Section of the November 2007 issue of Flow Control, thin-film RTDs do not perform as well as wire-wound RTD elements in high-vibration and severe mechanical shock environments. However, when utilized with shell-and-spacer solder encasing as taught herein, thin-film RTDs can be effectively employed even in the most extreme conditions.

Another aspect of the invention that may assist in protecting against vibration damage involves the manner in which a pair of thin-film RTDs can be situated back-to-back within the spacer. Then, the lead wires thereto can be wound together starting where they emerge from the sensor body. This construct provides a stiffer, stronger configuration helping to avoid wire lead fracture/breakage due to vibration and shock loading.

In spite of the advantages, it is to be appreciated that the present invention can be practiced without the use of solder (or, alternatively, braze) as a gap filler. Rather, an altogether different fill material may be used. Such fillers include cements, thermal grease, epoxies and metal particle filled versions thereof. All of these, however, are less preferred than solder and/or higher temperature braze. These (and possibly other) flowable metals offer higher thermal conductivity, excellent ductility and are capable of forming a strong bond between elements that will not crack, thereby improving long-term stability.

As for configuring the spacer to provide a fillable gap between the shell and itself, such an approach allows for lower spacer element part cost (as compared to the previous "dry" sensor approach described above) by reducing part tolerance requirements, since no press-fit between the shell and spacer is required in order to achieve superb thermal conductivity and overall stability. Also, since it is the intent to fill the open space within the shell (possibly up to the level of the spacer), the far/distal end of the spacer need not be shaped to exactly match the distal profile of the shell. Rather, the spacer can simply be terminated. It may have a flat end. However, to reduce solder volume (and fill more volume with—typically—more highly conductive spacer material) the spacer more preferably is chamfered at its distal end. Such an end is easily turned to shape, while offering an approximate match to a domed shell end. In addition, a chamfered end may be useful in avoiding the production of air pockets in the solder when the spacer is submerged in a bolus of solder/braze.

Moreover, it is to be appreciated that not all variations of the invention are practiced with an outer housing shell. Rather, an inexpensive variation of the invention may be provided having only the spacer, fill material and thin-film RTD(s) therein, but no housing shell. In this variation, the spacer may have an extension from its proximal end connected to the greater mass flow sensor housing. Such an extension may be a thin-walled tubular body, or another shape adapted to minimize stem conduction. The extension may comprise part of the spacer itself, or it may be a separate element (e.g., a thin-walled stainless steel tube) connected thereto. In the latter case, the connection may be provided by soldering, brazing, press or shrink fit, a threaded interface, etc.

In any case, it may be desirable to make the spacer from more than one piece of material. In one advantageous arrangement, the spacer comprises two pieces stacked axially. Constructed in this manner, the depth of machined slots within the pieces is minimized, thereby allowing faster machining feed rates without tool breakage. Note also, while thin-film RTDs are generically referenced above, use of this terminology is also intended to apply to the preferred use of Thin-Film Platinum Resistance Temperature Detectors (TFPRTDs).

The assemblies described above may be configured in connection with relevant hardware for use as an insertion or as an in-line type flow meter. Complete mass flow meters include primary fluid temperature and velocity sensor elements. When one or more sensors are encased within the spacer, it constitutes the heated tip of the velocity sensor element. If another sensor separated from the heated tip a defined distance from the spacer is optionally provided, it enables compensation for stem conduction as described in U.S. Pat. No. 6,971,274 and 7,197,953.

With two sensors set in the spacer for the velocity sensor, an array is provided that can offer a lower "equivalent" resistance so that lower supply voltages (e.g., at 24 VDC as is standard) can be used to deliver the power required to the overall heated sensor element. So-arranged, two standard mass-produced sensors with higher resistances can be connected electrically in parallel to halve the equivalent resistance of the pair. Thus, for example, two 100 ohm sensors yield a 50 ohm equivalent resistance. Two thin-film RTDs back-to-back with active areas directed outward provide an advantageous, "neat" configuration since it performs essentially as a constant temperature unit because the heated areas are outside the mass of the sensor pair and are essentially at the same temperature.

However configured, the meter's sensor elements are typically used in connection with a programmed general-purpose computer or dedicated electronic control hardware—either example of such hardware including a data processor. In the present invention, each RTD sensor in the velocity sensor element is preferably a TFRTD sensor. It is desirable, though not necessary, for all of the sensors to be TFRTD sensors.

In sum, the present invention includes systems comprising any of the features described herein. Methodology, especially in connection with manufacture, also forms part of the invention.

BRIEF DESCRIPTION OF THE DRAWINGS

The figures diagrammatically illustrate aspects of the invention. Variation of the invention from that shown in the figures is contemplated, for example, as contemplated in a broader sense in the Summary above. Fluid flow direction is indicated in many of the figures by arrows.

FIGS. 1A and 1B show front and side views, respectively, of a thin-film RTD (TFRTD/TFPRTD) sensor element;

FIG. 2 shows a partial side-sectional view of a complete thermal anemometer sensor assembly including velocity and temperature sensor elements as may be employed in connection with the present invention;

FIG. 3 shows a partial sectional view of a preferred fluid temperature sensor element;

FIG. 4 shows a partial side-sectional view of a sensor head of a thermal anemometer with an insertion-type configuration according to the assembly of FIG. 2 set therein;

FIGS. 5A and 5B show a partial side-sectional view and an end view, respectively, of an alternative insertion-type thermal anemometer as may be employed in connection with the present invention;

DETAILED DESCRIPTION

Figure 6:
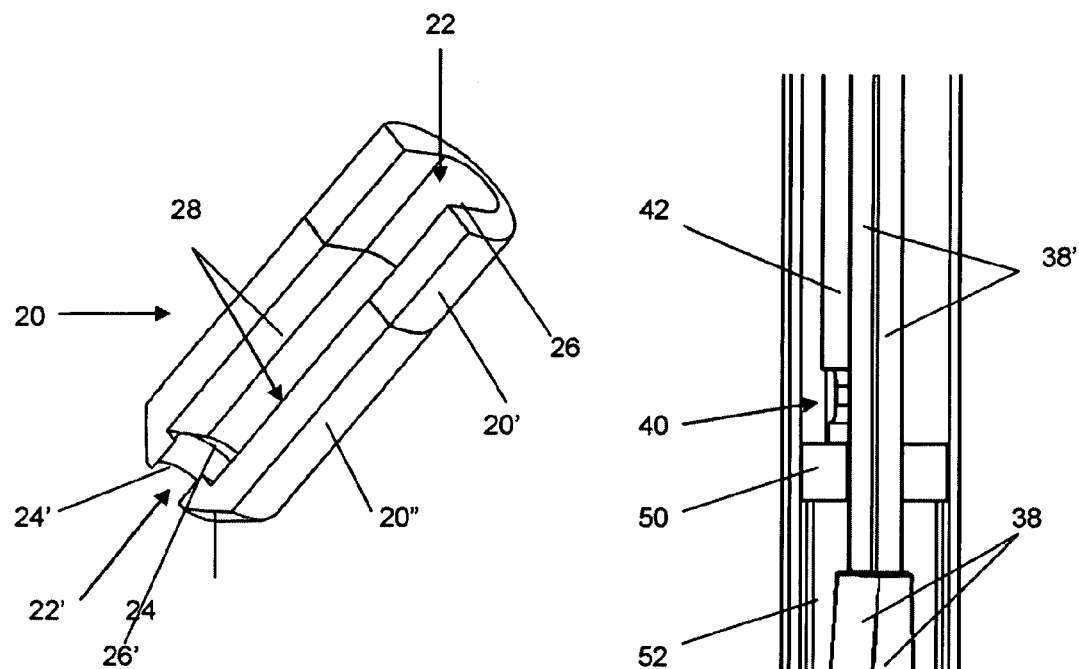
FIG. 6 shows an oblique sectional view of a spacer interface member for one or more of the heated temperature sensors shown in FIGS. 1A and 1B.

Turning now to FIGS. 1A and 1B, these show a view of the type of temperature sensor 2 employed in the present invention. The sensor shown is a "thin film" type sensor as described above. The particular sensor shown is a Thin-Film Platinum Resistance Temperature Detector (TFPRTD) as commonly available. An active area 12 of the device is provided, over which area the TFPRTD is self-heated by current during use. Sensor 2 includes lead wires 4 connected to weld pads leading to active region 12 and covered by a glass strain relief 10. The body 8 of the sensor is made of high-purity alumina, preferably held to a thickness tolerance within about ±0.002 to 0.001 inches as commonly available. A thin layer of glass electrical insulation 14 is provided over the TFPRTD active area. Of course, the PRTD is only exemplary as other TFRTDs may be employed in the invention. For example, other thin-film RTDs optionally employed in the invention may utilize nickel or other metals for the devices' electrically resistive array.

Details as to how any such hardware (as well as altogether different types of sensors) may be employed in connection with the subject velocity sensor element are provided further below. As for the more global construction of a thermal mass flow meter in which the present invention may function, FIG. 2 illustrates a velocity sensor element/assembly 30 and a fluid temperature sensor element/assembly 56 provided in a greater sensor housing assembly 60. The sensor element assemblies are set within sensor head 62 with their respective leads optionally potted in epoxy, cement (or the like) with insulated wires 64 arranged for connection to a processor 66.

While such constructional details are within the level of those with skill in the art to handle without undue experimentation, FIG. 3 illustrates a particular fluid temperature sensor element 56 as advantageously employed in the present invention.

As illustrated, the assembly preferably includes two TFRTDS. The distal sensor 72 is the primary sensor for measuring the temperature of the flowing fluid. The proximal sensor 70 compensates for stem conduction as described in U.S. Pat. No. 5,879,082. In some applications, such as those involving certain liquids and certain gases at high velocity, stem-conduction errors are relatively small and in those applications proximal temperature sensor 70 is not needed.

For thermal anemometers of an insertion-type configuration, yet another advantageous innovation is shown in FIG. 4. Here, an open-ended protective sensor head 80 is shown in partial cross section. The sectional view reveals the placement of the velocity and fluid temperature sensor elements in the sensor head. On either side of the sensor elements/assemblies, legs 82 defining an open channel and extending beyond the sensor elements are provided. The legs are of particular use when a technician is installing a completed meter into a pipe section or other location. The legs prevent inadvertent damage of the sensor elements during the installation procedure as well as offering protection from mishandling in the meantime. Use of a protective shield for the sensor elements of insertion thermal anemometers has precedence, but such shields normally are closed at their distal end. The shielding of sensor head 80 of the present invention is open at its end and thereby eliminates the flow disturbance created at the distal end of closed ended shields and consummates ultimately in better accuracy.

FIGS. 5A and 5B show a complete probe assembly of an insertion-type meter constructed with tubular stem 88 and the sensor head 80 of FIG. 2. This meter is sealed and connected to the flow channel or stream by means of a compression fitting, flange or other like means. The constituent elements of the system are as described and designated by numerals above.

To facilitate proper installation orientation by an end-user a pointer indicating flow direction may be incorporated in the housing. Moreover, the present invention is suited for use in connection with various other flow meter configurations in addition to those shown the various figures. As for other manners in which the present invention may be implemented (i.e., housed or integrated in a flow system, in the configuration of an in-line flow meter, etc.), these are either known or readily appreciated by one with skill in the art; further examples of which are sold by Sierra Instruments, Inc., and shown in the above-referenced '274 patent from which much of the above detailed description derives.

In addition, it is to be understood that the thermal anemometer of the invention retains advantageous performance if operated with either digital or analog sensor-drive electronics, or with a combination of both, in either the constant-temperature or constant-current modes of operations, all as described in the above mentioned book chapter authored by the inventor hereof. Digital electronics may be preferred for reason of simplified computations based on heat-transfer correlations and corrective algorithms, that compensate for any changes (e.g., as referenced to flow calibration conditions) in the fluid itself, fluid temperature, fluid pressure, ambient temperature, and other variables and influence parameters, thereby yielding higher system accuracy. Said heat-transfer correlations and corrective algorithms are based on known empirical heat transfer correlations, specific experimental data for the thermal anemometer of the present invention, physics-based heat transfer theory, and other sources.

Velocity Sensor Configuration

Figure 7:
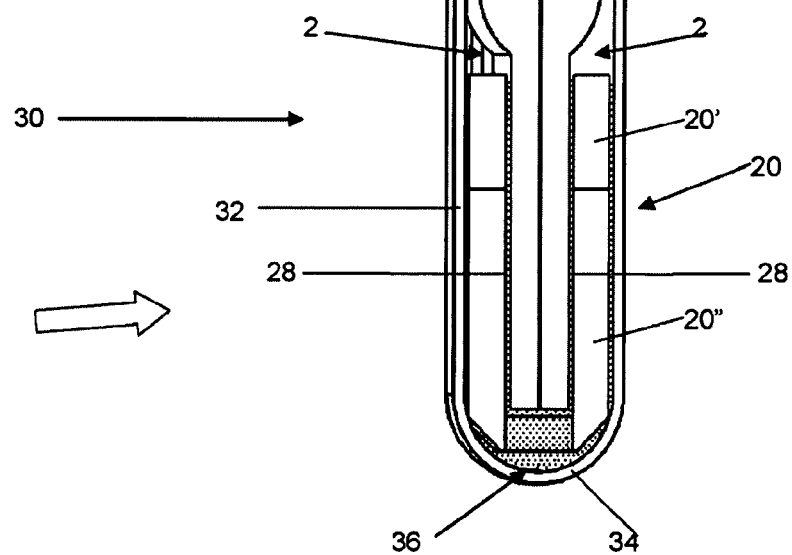
FIG. 7 shows a partial rotated side-sectional view of a velocity sensor element in accordance with the present invention.

As for the features unique to the present invention (vs. those described above that may be incorporated in the invention), they concern the implementation of RTD and/or spacer capture within a velocity sensor element 30. FIGS. 6 and 7 show a spacer member 20 according to the present invention for receiving one or more RTDs therein.

Interface member or spacer 20 preferably comprises a metal such as copper. The material is selected for its high thermal conductivity. As such, other metals and alloys including free-machining copper alloys, other copper alloys, bronze, brass, zinc, aluminum, aluminum alloy, silver, gold, alloys thereof, stainless steel, etc., as well as high thermal conductivity ceramics. The material should have a range of thermal conductivity between about 15 and about 500 watts per meter per degree Kelvin. The material selected for the spacer may preferably be one that is easily machined. Still, the spacer may be fabricated by any of conventional machining, laser or electrical discharge machining, powdered metal molding, injection molding, casting, extruding, stamping, forging, or by any other method suitable for producing tolerances as described herein.

In the present invention, spacer 20 provides an intermediate solid body between one or more sensors 2 and the housing shell 32 of the velocity sensor element 30. As seen in FIG. 7, the chamfered distal end 24, with terminal annulus 24', of the spacer provides an approximate match to housing shell 32 distal end 34.

Since a goal of the spacer is to provide controlled gaps between the spacer, shell and/or sensors (which spaces are filled in order to purge highly insulative air spaces), the shape of bore 22 will depend on the shape of the sensor(s). In this invention, the pocket 26 shown is a slot adapted to receive two sensors with faces 28 substantially parallel to the active areas 12 of the sensors when assembled.

With an oblong or rectangular slot milled in the proximal and distal pieces (20' and 20", respectively) defining the overall spacer body 20, vacant space is left open along the sides of the sensors when installed. This space it to be filled with solder (or otherwise) in a final assembly like that in FIG. 7 where the fill is indicated by stippling 36.

It is advantageous to limit the gaps between the spacer 20 and the housing shell 32 and between the spacer 20 and the active face or faces 12 of sensors 2 to the range, preferably, of about 0.001 to about 0.007 inches on each side of the bodies. The range may, however, be broader between about 0.001 to about 0.015 inches, and up to about 0.020 inches maximum. If these gaps are significantly larger, the accuracy of the meter due to increased skin resistance is degraded when using a solder compound with a thermal conductivity less than the preferred copper spacer. This is of most concern for the gaps between the spacer and the active face or faces of the sensor(s) because the heat flux is highest there.

Additionally, larger gaps may reduce the long-term stability and strength of the joints. Solder also fills the gaps between the edges of the sensor(s) and the spacer bore 22. Here, gap limitations are of less concern because a minority of heat is conducted from the sensor(s) to the spacer through these paths. In the case of multiple sensors and/or multiple spacer pieces, some solder may flow into the contact interface between said parts, but the extent and thickness of such interfacial solder layers are of minor consequence.

Further, this invention optionally encompasses the use of sensor(s) other than thin-film RTDs including, but not limited to, thermisters, thermocouples, thermopiles, micro-machined sensors, wire-wound RTDs and semiconductor junction thermometers. With any of these other optional sensors, the bore of the spacer is configured to adapt to the sensors' geometry with gaps suitable for filling and, thus, reducing skin resistance. However configured, according to the present invention, such skin resistance in the velocity sensor unit will be below about 1.5 degrees Kelvin per watt, typically be below about 1 degree Kelvin per watt, and more or most advantageously below about 0.5 degrees Kelvin per watt.

In order to best fill the inside of spacer body 20 during submersion in a bolus of liquid solder, the distal end of the spacer is opened. Distal opening 22' is advantageously a round drilled or milled hole. So-configured, a ledge or slot base 26' is provided to serve as a stop or abutment feature to precisely position the end of the sensor(s) within the spacer. As shown, both spacer pieces 20' and 20" are captured, together with sensors 2 in shell 32 by solder that has climbed (e.g., by capillary action and/or displacement due to the weight of the sensor/spacer subassembly and any additional force applied thereto) along the inner and outer surfaces of the gross spacer body 20 (i.e., along pieces 20' and 20").

To account for stem conduction, another thin-film RTD sensor 40 may be provided with ferrule 50. It may also be desired to provide longitudinal spacer collar 52 to carefully define the distance between ferrule 50 (for when it might be included with a sensor 40) and spacer 20 carrying sensor(s) 2. Collar 52 may have a tubular or other configuration that provides the defined distance and has a relatively low heat conductance.

Sensor leads, optionally encased in electrically insulative housing(s) 42, connect to sensor 40 proximally. Likewise sensor lead wires 4 (not shown in FIG. 7) may be set with electrically insulative housing(s) 38/38' as described further below in reference to sensor assembly, or otherwise. The electrically insulative housings may be tubes or glands having a single bore or multiple bores and may be constructed of plastic (e.g., fluorocarbons, such as Teflon®) and, for higher temperature applications, of ceramic (e.g., mullite or alumina) or other higher temperature electrically insulative materials. The washer-like ferrule 50 optionally has one or more holes for the passage of the electrically insulated sensor lead wires 4 and is constructed preferably of copper, but also may be constructed of another material, typically, with high thermal conductivity.

Velocity Sensor Assembly/Manufacture

In an exemplary mode of assembly, two 100 ohm TFPRTD sensors are held back-to-back in an electronics vice with their active areas facing outward. After the lead wires are untangled, four short electrically insulative, fluorocarbon tubes are threaded over each wire such that they press flush against the strain relief of the two sensors. Next, adjacent sensor wires are twisted such that the two sensors are electrically hooked up in parallel. So-configured, the twisted pairs may be fed through two longer fluorocarbon tubes.

The sensors are removed from the vice and inserted into the bore in the spacer until they bottom out. Then, the longitudinal spacer collar is slipped over the top of the twisted pairs. In the exemplary mode of assembly, the collar is constructed of a thin walled stainless steel tube. Next, the lead wires in the two longer fluorocarbon tubes are fed through the hole(s) in the ferrule. Finally, to complete the subassembly, the ferrule is pushed longitudinally against the collar effecting tight contact between the collar and ferrule, the collar and spacer, spacer pieces, and the sensors and the bottom of the spacer pocket.

After the sensor housing shell is prepared (e.g., by pickling solution, rinsed and dried) the subassembly can be secured in the housing shell. In the exemplary mode of assembly, the sensor housing shell is a stainless steel or nickel alloy tube. The area of the shell over which a solder connection is desired may be further prepared by coating with flux. So-too may be the interior and exterior of the spacer. After weighing out a desired amount of solder, it too may be coated or covered with flux. Such coating is most easily accomplished by coating a length wrapped around a rod. However, solder pellets, etc., may be employed—as may be flux core solder material.

In the exemplary mode of production, the solder mass is next set into the closed bottom or distal end of the sensor housing shell, with the shell oriented vertically. The subassembly is then inserted until it bottoms-out against the solder.

With care to maintain any desired orientation of the sensors relative to housing location features, the two electrodes of a resistive soldering machine are clamped to opposite sides of the distal tip of the velocity sensor housing shell. The electric current from the soldering machine flows from one electrode to the other generating heat in the tip of the shell. The TFPRTDs can be used to monitor the temperature of the tip. The voltage of the soldering machine is ramped up to a predetermined temperature set point that is sufficiently high to melt and flow the solder but is sufficiently lower that the melting points and other upper temperature limits of the TFPRTDs and all other components in or near the tip of the shell.

At a selected set point, the weight of the subassembly (optionally augmented by additional force) causes the subassembly to sink into the molten solder, upon which the distal end of the spacer should contact the closed distal end of the housing shell. In so doing, the spacer and sensor(s) displace a volume of molten solder so it flows via displacement and/or capillary action upward into the gaps between the spacer and the housing shell and between the TFPRTDs and the spacer.

The weight of the charge of solder loaded into the tip of the shell is selected so that this process results in the solder level in all gaps just reaching the top, or proximal, end of the spacer. If the spacer is constructed of more than one piece and/or multiple sensors are employed, the contact interface(s) between such pieces may also fill with solder either totally or partially, either case being inconsequential to the invention herein.

In the optional case where an additional temperature sensor is used to correct for stem conduction, after the soldering machine is disconnected and the solder cools down and solidifies, the stem conduction temperature sensor with its electrically insulated leads is inserted down the housing shell until it bottoms-out on top of the ferrule. A suitable cement, epoxy, or similar compound may be employed above the ferrule to fix the sensor in place and provide thermal contact.

Naturally, other approaches may be employed to carry out the soldering procedure. For instance, the end of the shell may be heated directly by a soldering iron, radiant energy and/or convective flow.

Moreover, various parts can be "pre-tinned". Other preparation is possible as well. Namely, for the sake of avoiding diffusion between solder components and adjacent part(s) and/or the formation of intermetallic compounds, either one or both of the spacer and housing shell may be plated with a metallic (e.g., Nickel) or other barrier film.

While solders (e.g., silver, gold or lead-based solders) having a melting temperature (i.e., liquidus) in the range of about 200° C. to about 350° C. are advantageously employed, solders with higher or lower temperature ranges may be employed. Likewise, higher temperature "brazing" compounds (e.g., silver braze) or other low melting point metals may be employed. In all cases, such "fill" materials have both the liquidus and solidus (i.e., the solidifying temperature point) sufficiently less than the melting point and other upper temperature limitations of the thin-film RTD and/or lead wire, electrically insulative material and, less typically, of the spacer, housing shell, and ferrule. When using TFPRTD(s) and ceramic lead-wire insulators, the solidus and liquidus of the solder/braze compound will typically be less than about 650° C. Finally, the solder/braze compound for a given application may also be selected for stability at its interfaces with the housing shell and spacer.

Regarding assembly of the remaining portions of a fully-functional mass flow sensor, the required techniques are well known in the art. Even so, reference is made to the above-referenced commonly assigned patents, incorporated herein by reference for such other description and/or detail.

Variations

Exemplary aspects of the invention, together with details regarding material selection and manufacture have been set forth above. As for other details of the present invention, these may be appreciated in connection with the above-referenced patents and publications as well as is generally known or appreciated by those with skill in the art. The same may hold true with respect to method-based aspects of the invention in terms of additional acts as commonly or logically employed. Regarding such methods, including methods of manufacture and use, these may be carried out in any order of the events which is logically possible, as well as any recited order of events. Furthermore, where a range of values is provided, it is understood that every intervening value, between the upper and lower limit of that range and any other stated or intervening value in the stated range is encompassed within the invention. Also, it is contemplated that any optional feature of the inventive variations described may be set forth and claimed independently, or in combination with any one or more of the features described herein.

Though the invention has been described in reference to several examples, optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention.

Reference to a singular item includes the possibility that there are a plurality of the same items present. More specifically, as used herein and in the appended claims, the singular forms "a," "an," "said," and "the" include plural referents unless specifically stated otherwise. In other words, use of the articles allow for "at least one" of the subject item in the description above as well as the claims below. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in the claims shall allow for the inclusion of any additional element—irrespective of whether a given number of elements are enumerated in the claim, or the addition of a feature could be regarded as transforming the nature of an element set forth in the claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of the claim language.

The invention claimed is:

1. An apparatus for use in a mass flow meter for immersion in a fluid including a velocity sensor element, the velocity sensor element, comprising:
   an elongate housing shell,
   a distal portion of the housing shell receiving a solid metal spacer therein,
   the spacer receiving at least one thin-film Resistance Temperature Detector (RTD) sensor therein, the sensor comprising an active area and electrical leads to carry current to the active area from a proximal end of the shell, and
   a fill metal, the fill metal having a melting point below a temperature that will damage the at least one RTD and electrical leads, the fill metal interposed between the spacer and the shell, and between the spacer and at least the RTD active area.

2. The apparatus of claim 1, further comprising a temperature sensor separate from the velocity sensor.

3. The apparatus of claim 1, wherein the housing shell has a closed distal end.

4. The apparatus of claim 1, further comprising a computer processor.

5. The apparatus of claim 1, wherein the spacer comprises stacked pieces.

6. The apparatus of claim 1, wherein the spacer defines a through hole.

7. The apparatus of claim 6, wherein two thin-film RTD sensors are set within the hole in a back-to-back orientation.

8. The apparatus of claim 7, wherein a distal end of the spacer is chamfered to a terminal annulus.

9. The apparatus of claim 1, wherein the spacer comprises at least one powdered metal fabricated piece.

10. The apparatus of claim 1, wherein the spacer is fabricated from at least one piece of bar stock.

11. The apparatus of claim 1, the spacer comprises a material selected from pure metal, metal alloy and high thermal conductivity ceramic.

12. The apparatus of claim 10, wherein the housing shell comprises stainless steel.

13. The apparatus of claim 1, wherein the fill metal is selected from solder and brazing compounds.

14. The apparatus of claim 13, wherein the fill metal is silver solder.

15. An apparatus for use as a mass flow meter in a fluid, comprising a metal spacer having cross-section defining a circular diameter and a hole, the hole sized to fit at least one thin-film RTD temperature sensor with a gap up to about 0.020 inches around the at least one sensor, and a fill material at least substantially filling the gap.

16. The apparatus of claim 15, wherein the gap is less than about 0.015 inches.

17. The apparatus of claim 16, wherein the fill material comprises a metal having a melting point below a temperature that will damage the at least one RTD.

18. A method of making an apparatus for use as a mass flow meter in a fluid, the method comprising:
   providing an elongate housing shell with a closed distal end, a metal spacer, at least one thin-film Resistance Temperature Detector (RTD) sensor, and a bolus of fill material within the distal end of the housing shell;
   setting a portion of the at least one thin-film RTD sensor in the spacer; and inserting the spacer into the housing shell to cause the fill material to flow between the shell and spacer.

19. The method of claim 18, wherein a distal end of the spacer is open and the fill material also flows between the at least one thin-film RTD and the spacer.

20. The method of claim 18, wherein the full material comprises solder or braze and is heated to form the liquid bolus after introducing it in a solid state into the housing shell.

* * * * *